Patented Sept. 26, 1950

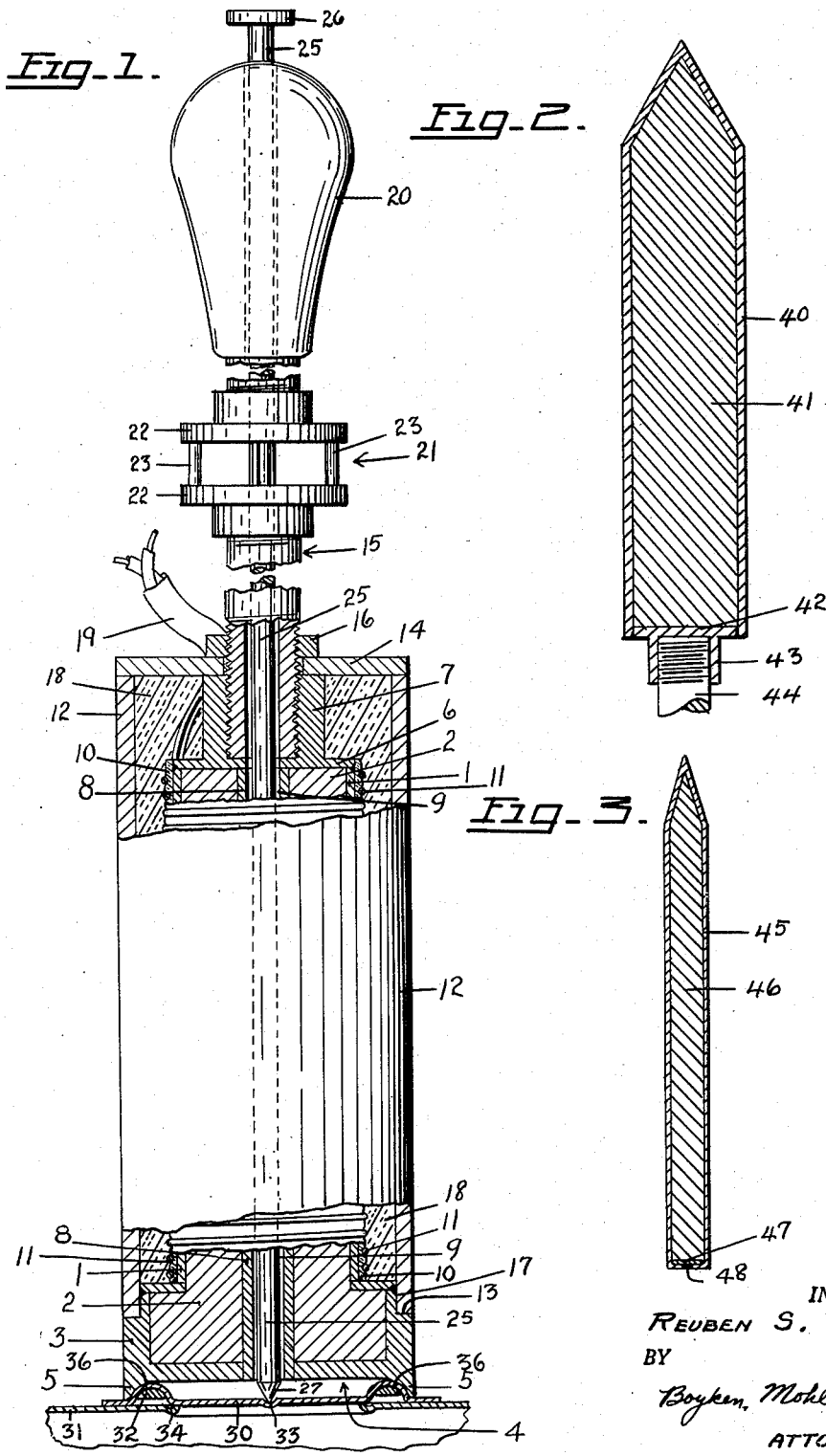

2,523,638

UNITED STATES PATENT OFFICE 2,523,638

SOLDERING IRON

Reuben S. Tice, Monterey, Calif.

Application April 7, 1944, Serial No. 529,939

4 Claims. (Cl. 113—105)

This invention relates to soldering irons and has for one of its objects the provision of an improved soldering iron that will not pit, or oxidize from the atmosphere, or dissolve in the solder, as occurs with the conventional copper soldering irons, and which improved soldering iron is easily and economically made without resorting to specially produced alloys or plating or the like.

Another object of the invention is the provision of a soldering iron that is substantially non-oxidizable at high temperatures and is adapted for use with high melting point solders without injury thereto, yet which soldering iron is economical to use and to make and the working surface of which is readily cleanable merely by wiping with a cloth or the like instead of the customary cleaning required with conventional copper soldering irons where the tips must be scraped or cleaned with acid, etc.

A still further object of the invention is the provision of a soldering iron having a non-oxidizable working surface, and which iron is particularly designed for use in canneries for soldering caps or the like over filling holes in such cans, where the cap or closure should be held in place during cooling of the solder as well as during the soldering operation. This particular soldering iron substantially simultaneously solders all edges or margins of the closure to the can head and is provided with means for not only properly positioning the working surface of the iron relative to the margins of the closure, but which is also provided with means for holding the closure after removal of the iron and during cooling of the solder.

The use of copper for the body of soldering irons has always been preferable to other metals on account of its desirable characteristics, particularly its good heat conductivity. However copper readily pits and oxidizes and attempts to overcome this have been made by providing tips for the copper body. Heretofore such tips have been generally special alloys of several metals, such as copper, zinc and nickel, or tantalum and nickel, or iron and nickel, or chromium and nickel, and other alloys. In many instances the tips have been removable from the soldering irons, and in others partial shells of metal alloy have been provided.

In my soldering iron I use a copper core, both in ordinary or in electrically heated irons, and in every instance a complete shell of a ferrous metal, such as cold rolled steel for example, completely encloses the core against oxidization from the air at any point, and the copper core is bonded integrally with the shell. Irons so made are practically indestructible and do not pit or oxidize and the working surfaces are readily tinned and are easily kept clean merely by wiping the same on a rag or the like. The admission of air to the copper at any point results in rapid deterioration of the iron and unless the shell is bonded to the copper there is an objectionable loss in heat conductivity.

Other objects and advantages will appear in the drawings and in the description.

In the drawings, Fig. 1 is an enlarged part sectional and part elevational view of my improved soldering iron for use in canneries. The closure to be soldered and the head of a can to which the closure is to be attached are also shown in section with the soldering iron in operating position against the closure.

Fig. 2 is a sectional view of a soldering iron of my invention of the tip used by tinners and plumbers for general work.

Fig. 3 is a sectional view through a soldering tip of my invention that is of the type used for radio and instrument work.

In detail, the soldering iron illustrated in Fig. 1 comprises an elongated cylindrical, tubular shell 1 of ferrous metal which may be ordinary cold rolled steel or stainless steel. This shell 1 hermetically seals therein a copper core 2, said shell having an enlarged end 3 provided with an axially facing circular working face 4 with an axially projecting annular flange 5 around its edge. The opposite end of shell 1 is closed by a head 6 that carries an axially outwardly projecting, internally threaded sleeve 7 secured thereto.

The core 2 is formed with an open ended through passageway and the end 3 and head 6 are formed with openings coaxial therewith while a lining 8 for said passageway is welded at its ends in the opening in said end 3 and head 6. The body of the soldering iron that includes said shell, end 3, head 6 and core 2 is thus provided with a central through passageway 9 that opens at one end centrally into one end of sleeve 7, while the opposite end opens outwardly of the circular working face 4 centrally thereof.

A layer of electrical insulation material 10, preferably of ceramic material, is secured around the shell 1 from enlarged end 3 to the opposite end, and this material may be spirally grooved on its outer surface for carrying the wires 11 of a conventional electrical heating element for heating the shell and core.

Coaxial with the shell 1 and spaced outwardly thereof is the cylindrical wall 12 of an outer housing. One end of said wall 12 may be fitted against a shoulder 13 formed on the enlarged end 3 of shell 1, whereby said end 3 will close the end of wall 12 adjacent thereto. A circular disk or cap 14 closes the opposite end of said wall, said cap being centrally apertured for passage of the threaded end of a tubular handle 15 therethrough for threaded engagement with the threads in sleeve 7. The cap 14 may simultaneously be supported on the outer end of said sleeve 7 and on the end edges of said cylindrical wall 12. A lock nut 16 outwardly of said cap and threaded on handle 15 may securely hold the cap against said sleeve and wall and at the same time hold the cap against said sleeve and wall and at the same time hold the opposite end of the housing wall 12 against shoulder 13. The housing wall 12 is centered relative to the shell 1 by the radially facing portion 17 of the head 3 adjacent shoulder 13.

The space between the outer housing, which includes wall 12 and cap 14 is filled with any suitable heat insulation material 18 such as glass wool, asbestos, etc.

The cap 14 may carry any suitable terminals (not shown) for the lead-in electrical cord 19 that connects with the heating element 11, which cord may carry a conventional plug attachment.

The handle 15 may be formed intermediate a wooden or composition hand grasping portion 20 and nut 16 with a heat trap 21 of any conventional design, the same being here shown as a pair of disks 22 connected by spaced posts 23, one of which disks is connected with the end of one section of handle 15 while the other disk is connected with an end of a second section, it being understood that the handle is in a pair of sections instead of being continuous.

The passageway 9 continues through both sections of handle 15, said sections being coaxial, and also through the portion 20. Relatively loosely slidable in said passageway is a rod 25 or iron locating device having a button 26 at the end projecting outwardly of portion 20, while the opposite end 27 may be pointed.

In fabricating the soldering iron above described, the shell 1 after thorough cleaning and dipping in a borax solution may be filled with molten copper and then closed at the filling end, as by head 6, the latter being then welded to the shell 1. Or a copper rod may be inserted in the shell and the shell and rod then brought up to the melting point of the copper in a suitable furnace, after which the head 6 is welded over the open end thereby hermetically sealing the copper in the shell. In either case the copper will integrally bond with the steel shell.

The iron of Fig. 1 is particularly intended for use in soldering a disk-like circular closure 30 over an opening in the head 31 of a container. These closures are conventional and are formed with an annular recess opening outwardly from one side of the disk, which recess carries the solder 32. Centrally of said disk is generally a depression 33 that provides a recess opening outwardly of the side of the disk opposite the solder 32.

The margins of the opening in the can top 31 are adapted to close the outwardly opening annular recess in the closure 30 when the latter is laid on said top in a position closing said opening, and along the edge of said opening is formed a small upwardly opening recess 34.

In forming the recess in the closure 30 an annular ridge 36 is formed on the upper side of the closure, and the flange 5 of the soldering iron is designed to just fit over this ridge so that the radially inwardly facing side of the flange will fit against the ridge. When in this position the pointed end 27 of the rod 25 will fit in the depression 33 and the button 26 at the opposite end of rod 25 will be spaced above the portion 20 of the handle.

When the soldering iron is positioned as above described and as illustrated in Fig. 1 the solder 32 will be readily melted and will secure the closure to the top of the can. By pressing the thumb of the handle grasping hand on button 26 and raising the iron by said handle portion, the working face of the iron will be lifted from the closure 30 to permit cooling of the solder, but at the same time the closure will be firmly held against the can top during the cooling by the pressure on rod 25.

As soon as the solder has cooled the iron is quickly positioned on another closure, the said pointed end 27 of the rod being first inserted in the depression 33 to facilitate holding the closure in place while the iron is lowered onto the same and centering or positioning the iron on the closure.

Referring to Fig. 2, which is a sectional view taken through a soldering iron for general work, the shell 40 of the same kind of metal as shell 1 has a core 41 of copper integrally bonded therewith. The same procedure as described for the iron of Fig. 1 may be used in filling the shell 40 with copper, after which a head 42 is welded over the end hermetically sealing the core. The end of the shell opposite the head 42 is pointed the same as is usual in soldering with a plurality of flat sides converging to the point, or a chisel-shaped working end may be provided, and the same holds true of the iron illustrated in Fig. 3.

The head 42 may carry an internally threaded socket 43 for receiving the threaded end of a shank 44 that is part of the handle or that carries a hand gripping portion (not shown) that is somewhat similar to portion 20 of Fig. 1.

The soldering iron tip of Fig. 3 comprises a shell 45 having a core 46 of copper. The shell may be of cold rolled steel or the like, and a head 47 hermetically seals the core against oxidation by the atmosphere.

The iron of Fig. 3, being of the type used for radio or instrument work, is of the usual shape of the conventional iron for such work having a pointed or chisel-shaped end opposite head 47. Except for the working end, both the irons of Figs. 2 and 3 usually have cylindrical shells and flat sided points and this shape is readily formed from steel tubing. In the iron of Fig. 3 the head 47 does not carry a socket member and may therefore be initially held in place by crimping the ends of the shell over the edges of the head and then welding the inturned edges to the head as indicated by welding 48 that is centrally of the head. In this form of iron the usual method of using the same is to removably secure the same in a socket or other similar member by any suitable means, such as a set screw. This practice and structure being common, the same is not here illustrated.

The structure employed in fabricating the iron of Fig. 1 whereby the housing that includes cap 14 and cylinder 12 may be quickly removed by loosening lock nut 16 and thereafter removing the handle 15 is highly desirable in that a quick replacement of a defective or worn out heating element may be quickly effected. The wall 12 and cap 14 may be of any suitable material, it being understood of course, that the connection between cord 19 and the heating element 11 is electrically insulated from cap 14 in the event the cap 14 is not of electrical insulation material.

While the head 3 and working face of 4 of the iron of Fig. 1, as shown, is intended for a particular kind of work, it is obvious that the working face may be modified for other work. The provision of the means for holding the work to be soldered in position before, during, and after soldering, and after removal of the heated iron from the work is a very important feature of this invention wherever an iron of generally the character described may be employed.

In the claims, the use of the term "shell" is intended to cover plating of ferrous metal on copper as well as a preformed shell, or application of the ferrous metal by atomic spraying.

Having described the invention, I claim:

1. A soldering iron comprising an elongated copper core formed with a through passageway coaxially thereof, a steel shell fully enclosing said core and providing a lining for said passageway, means rigid with said core for heating it, a handle secured to one end of said shell and the opposite end of the latter being formed to provide a working surface for engagement around the open end of said passageway for engagement with work to be soldered, a rod reciprocable in said passageway for projection of one end thereof outwardly of said working surface in engagement with said work at a predetermined point axially outwardly of said iron, said rod being adapted to slidably support said iron for movement of its said working surface into and out of engagement with said work, means connected with said rod and projecting from said handle for manual manipulation by the hand grasping the latter for causing said movement of said iron.

2. A soldering iron comprising an elongated copper core formed with a through passageway coaxially thereof, a steel shell fully enclosing said core and providing a lining for said passageway, means rigid with said core for heating it, a handle secured to one end of said shell and the opposite end of the latter being formed to provide a working surface for engagement around the open end of said passageway for engagement with work to be soldered, a rod reciprocable in said passageway for projection of one end thereof outwardly of said working surface in engagement with said work at a predetermined point axially outwardly of said iron, said rod being adapted to slidably support said iron for movement of its said working surface into and out of engagement with said work, means connected with said rod and projecting from said handle for manual manipulation by the hand grasping the latter for causing said movement of said iron, said means being an extension of said rod projecting axially outwardly of the end of said handle remote from said iron, and said handle being formed with a passageway therethrough coaxial with the passageway in said iron for said rod.

3. A soldering iron comprising an elongated copper core formed with a through passageway coaxially thereof, a steel shell fully enclosing said core and providing a lining for said passageway, means rigid with said core for heating it, a handle secured to one end of said shell and the opposite end of the latter being formed to provide a working surface for engagement around the open end of said passageway for engagement with work to be soldered, a rod reciprocable in said passageway for projection of one end thereof outwardly of said working surface in engagement wth said work at a predetermined point axially outwardly of said iron, said rod being adapted to slidably support said iron for movement of its said working surface into and out of engagement with said work, means connected with said rod and projecting from said handle for manual manipulation by the hand grasping the latter for causing said movement of said iron, said working surface being circular and formed with an annular flange projecting axially outwardly of said shell, said flange being coaxial with said passageway and with said rod.

4. A soldering iron comprising an elongated body of copper provided with a handle at one end thereof for manual grasping by an operator and the opposite end of said iron being of ferrous metal having an axially outwardly facing working surface adapted to engage the work to be soldered, a heating element around said body and rigid therewith for heating it, a housing enclosing said body and said element coaxial with the former, said opposite end of ferrous metal including a radially projecting flange adapted to support one end of said housing and a cap separable from said body and coaxial therewith engaging the opposite end of said housing, an extension rigid with said body projecting through said cap, means on said extension for clamping said cap against said housing for holding said housing between said cap and said flange, and said handle being secured to said extension outwardly of said cap and outwardly of said means relative to said body.

REUBEN S. TICE.

REFERENCES CITED

The following references are of record in the file of this patent:

UNITED STATES PATENTS

| Number | Name | Date |
|---|---|---|
| 445,771 | Dewey | Feb. 3, 1891 |
| 543,654 | Rae | July 30, 1895 |
| 559,337 | Lang, Jr. | Apr. 28, 1896 |
| 934,539 | Johnson | Sept. 21, 1909 |
| 1,006,543 | Funk | Oct. 24, 1911 |
| 1,064,739 | Johnson | June 17, 1913 |
| 1,127,970 | Dryfoos | Feb. 9, 1915 |
| 1,316,617 | James et al. | Sept. 23, 1919 |
| 1,350,181 | Remane | Aug. 17, 1920 |
| 1,572,666 | Marsden | Feb. 9, 1926 |
| 1,667,618 | Abbott | Apr. 24, 1928 |
| 1,957,325 | Davis | May 1, 1934 |
| 1,985,492 | Frohmuth et al. | Dec. 25, 1934 |
| 2,126,559 | Kirkpatrick | Aug. 9, 1938 |
| 2,311,776 | Powell | Feb. 23, 1943 |

FOREIGN PATENTS

| Number | Country | Date |
|---|---|---|
| 227,448 | Great Britain | May 28, 1925 |
| 705,120 | Germany | Apr. 18, 1941 |